United States Patent
Wang et al.

(10) Patent No.: US 9,510,336 B2
(45) Date of Patent: Nov. 29, 2016

(54) WIRELESS COMMUNICATION SYSTEM, TERMINAL, TRANSMISSION STATION, AND WIRELESS COMMUNICATION PROGRAM

(71) Applicant: KDDI CORPORATION, Tokyo (JP)

(72) Inventors: Xiaoqiu Wang, Fujimino (JP); Yuji Ikeda, Fujimino (JP); Satoshi Konishi, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 211 days.

(21) Appl. No.: 14/383,326

(22) PCT Filed: Mar. 8, 2013

(86) PCT No.: PCT/JP2013/056430
§ 371 (c)(1),
(2) Date: Sep. 5, 2014

(87) PCT Pub. No.: WO2013/133406
PCT Pub. Date: Sep. 12, 2013

(65) Prior Publication Data
US 2015/0029976 A1    Jan. 29, 2015

(30) Foreign Application Priority Data

Mar. 9, 2012  (JP) ................................ 2012-053288
May 10, 2012 (JP) ................................ 2012-108460

(51) Int. Cl.
*H04W 72/04* (2009.01)
*H04L 1/00* (2006.01)
(Continued)

(52) U.S. Cl.
CPC .............. *H04W 72/042* (2013.01); *H04L 1/00* (2013.01); *H04L 5/0053* (2013.01); *H04L 5/0023* (2013.01); *H04W 16/32* (2013.01)

(58) Field of Classification Search
CPC .. H04W 72/042; H04W 16/032; H04L 1/00; H04L 5/0053; H04L 5/0023
See application file for complete search history.

(56) References Cited

U.S. PATENT DOCUMENTS 8,842,622 B2 * 9/2014 Zhang ................... H04B 7/024
    370/203
9,247,542 B2 * 1/2016 Ahmadi ............ H04W 72/0453
(Continued)

FOREIGN PATENT DOCUMENTS

WO      2011/126008 A1   10/2011

OTHER PUBLICATIONS

3GPP, TS36.212 V10.4.0, Evolved Universal Terrestrial Radio Access (E-UTRA); Multiplexing and channel coding (Release 10):, (Dec. 2011).

(Continued)

*Primary Examiner* — Ajay Cattungal
(74) *Attorney, Agent, or Firm* — Morgan, Lewis & Bockius LLP

(57) ABSTRACT

A wireless communication system includes an upper transmission station and a lower transmission station, each serving as a transmission station, a terminal serving as a reception station. The upper transmission station allocates a downlink control channel for each terminal to part of a predetermined data-channel region ascribed to the lower transmission station based on a demodulation reference signal for each transmission station. Based on the allocation result, the lower transmission station allocates the downlink control channel for each terminal, which is disposed at art of the data-channel region thereof. The terminal decodes the downlink control channel based on the demodulation reference signal.

8 Claims, 8 Drawing Sheets

(51) Int. Cl.
    *H04W 16/32* (2009.01)
    *H04L 5/00* (2006.01)

(56) References Cited

U.S. PATENT DOCUMENTS

2011/0151913 A1* 6/2011 Forster ............... H04W 4/20
                                                455/509
2012/0120891 A1* 5/2012 Mazzarese .......... H04W 72/042
                                                370/329
2014/0119317 A1* 5/2014 Kim ................... H04L 5/0048
                                                370/329

OTHER PUBLICATIONS

NEC Group, ePDCCH with JT/DPS CoMP, 3GPP R1-120258, 3GPP, Feb. 6, 2012.
CATT, Considerations on E-PDCCH multiplexing with PDSCH, 3GPP R1-120110, 3GPP, Feb. 6, 2012.
KDDI Corporation, Remaining aspects of DMRS for ePDCCH, 3GPP R1-122535, 3GPP, May 21, 2012.
International Search Report dated Apr. 16, 2013 for International application No. PCT/JP2013/056430.

* cited by examiner

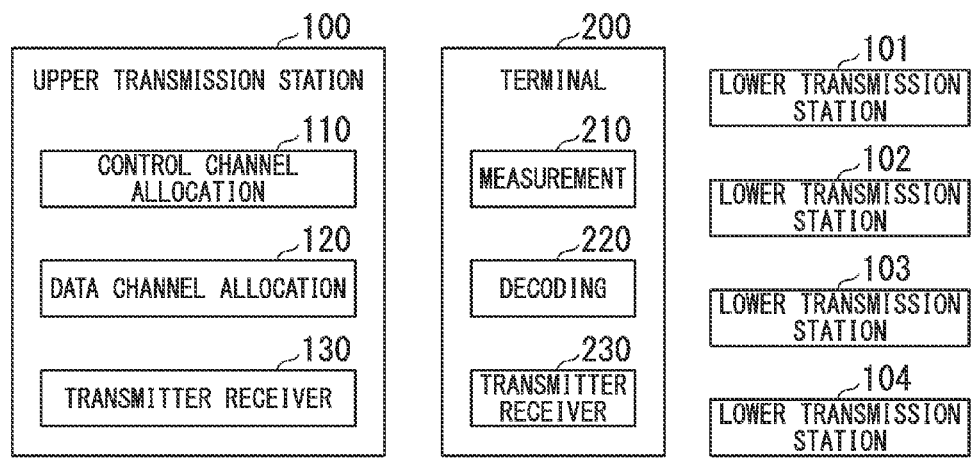

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}=0$ | 0 | 2 layers, ports 7-8, $n_{SCID}=0$ |
| 1 | 1 layer, port 7, $n_{SCID}=1$ | 1 | 2 layers, ports 7-8, $n_{SCID}=1$ |
| 2 | 1 layer, port 8, $n_{SCID}=0$ | 2 | 3 layers, ports 7-9 |
| 3 | 1 layer, port 8, $n_{SCID}=1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

FIG. 7A

| PARAMETER | ePDCCH POTENTIAL REGION |
|---|---|
| Y1 | ALLOCATION A |
| Y3 | ALLOCATION B |
| ... | ... |

FIG. 7B

| PARAMETER | ePDCCH POTENTIAL REGION |
|---|---|
| Y1 | ALLOCATION A |
| Y3 | NO ALLOCATION |
| ... | ... |

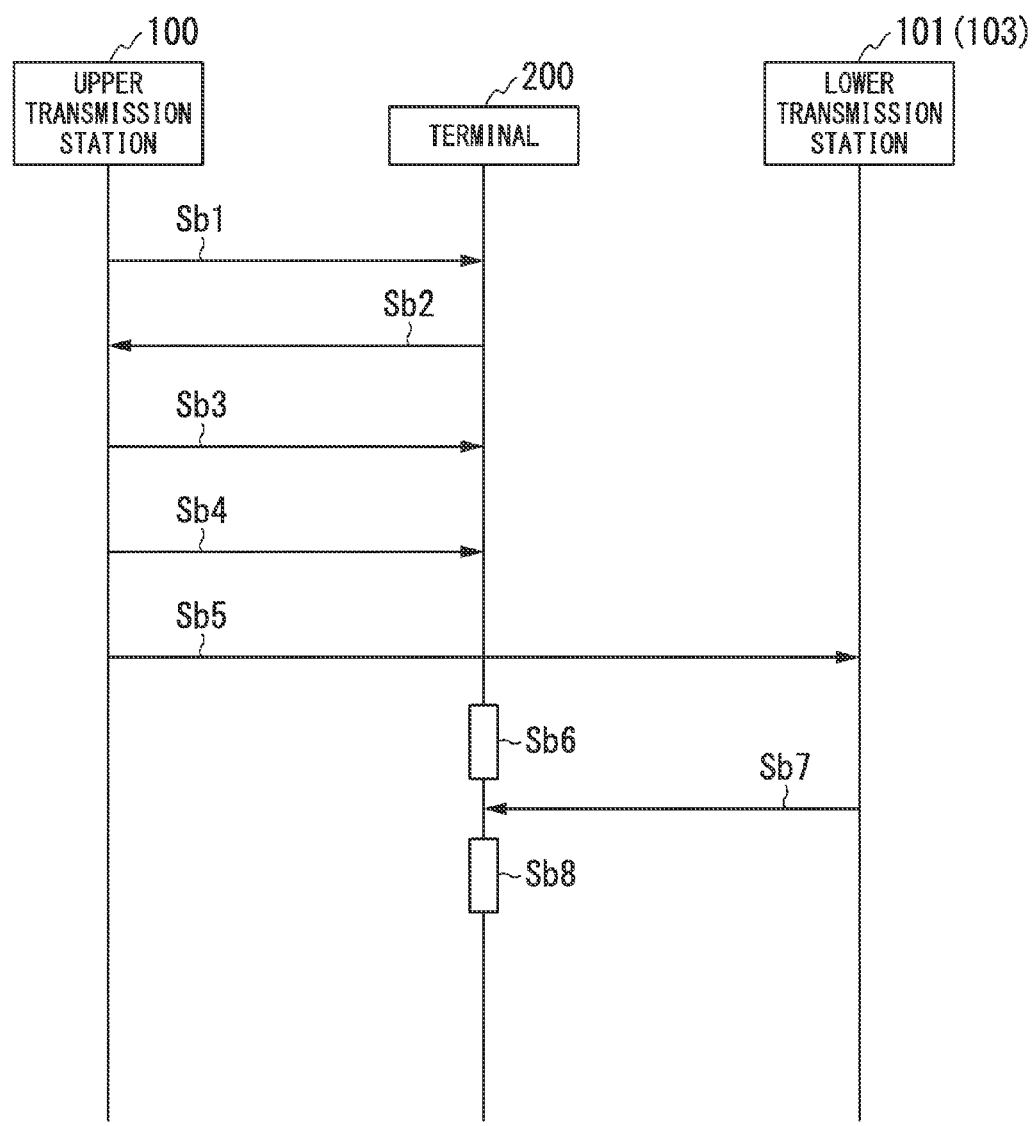

WIRELESS COMMUNICATION SYSTEM, TERMINAL, TRANSMISSION STATION, AND WIRELESS COMMUNICATION PROGRAM

TECHNICAL FIELD

The present invention relates to a wireless communication system, a terminal, a transmission station, and a wireless communication program.

The present application claims priority on Japanese Patent Application No. 2012-53288 filed Mar. 9, 2012 and Japanese Patent Application No. 2012-108460 filed May 10, 2012, the entire contents of which are incorporated herein by reference.

BACKGROUND ART

To notify radio resources allocated to terminals, physical downlink control channels (PDCCH) have been used in downlinks of LET (Long Term Evolution) serving as communication standards. A one-to-one correspondence is established between PDCCH and physical downlink shared channels (PDSCH) serving as data channels actually allocated with radio resources (see Non-Patent Literature Document 1).

CITATION LIST

Non-Patent Literature Document

Non-Patent Literature Document 1: 3GPP. TS36.212 V10.4.0, "Evolved Universal Terrestrial Radio Access (E-UTRA); Multiplexing and channel coding (Release 10)", June 2011

SUMMARY OF INVENTION

Technical Problem

The conventional technology suffers from a problem in that PDCCH according to the standard up to LTE Rel. 10 provides control channels with capacities insufficient to prevent a reduction of throughput of PDSCH. As a proposal to solve the problem, it is possible to adopt high-speed downlink channels (hereinafter, referred to as "ePDCCH (enhanced PDCCH)" with higher speeds than PDCCH according to the standard up to LTE Rel. 10. The ePDCCH is disposed at part of an area of a downlink data channel (PDSCH).

Demodulation reference signals (DMRS) are necessary for terminals to demodulate ePDCCH. The standard of LTE Rel-10 provides a suggestion in which terminals acquire necessary parameters of demodulation reference signals from PDCCH.

According to the suggestion directly applied to ePDCCH demodulation, however, it is necessary to allocate necessary parameters of PDCCH demodulation reference signals to PDCCH according to the standard up to LTE Rel. 10, which in turn further reduce already-insufficient capacities of PDCCH according to the standard up to LTE Rel. 10.

The present invention is made in consideration of the foregoing problem, and therefore it is an object of the invention to provide a wireless communication system, a terminal, a transmission station, and a wireless communication program, each of which is able to prevent a reduction of throughput of data channels without causing deficiencies of capacities in PDCCH according to the standard up to LTE Rel. 10.

Solution to Problem

The present invention is created to solve the above problem. The present invention is directed to a wireless communication system including an upper transmission station and a lower transmission station, each serving as a transmission station, as well as a terminal serving as a reception station. The upper transmission station allocates a downlink control channel for each terminal to part of a predetermined data-channel region ascribed to the lower transmission station based on a demodulation reference signal for each transmission station, transmits the allocation result to the lower transmission station, and transmits the downlink control channel for each terminal, disposed at part of the predetermined data-channel region thereof, based on the allocation result. The lower transmission station transmits the downlink control channel for each terminal, disposed at part of the predetermined data-channel region thereof, based on the allocation result. The terminal decodes the downlink control channel based on the demodulation reference signal.

In the wireless communication system of the present invention, it is preferable that the terminal generate the demodulation reference signal based on a parameter of a channel state information reference signal for each transmission station so as to decode the downlink control channel based on the generated demodulation reference signal.

In the wireless communication system of the present invention, it is preferable that the terminal select the transmission station based on a signal-to-interference ratio or reception intensity of the demodulation reference signal so as to decode the downlink control channel correlated to the selected transmission station.

In the wireless communication system of the present invention, it is preferable that the terminal select the transmission station based on reception intensity of a sounding reference signal for each transmission station so as to decode the downlink control channel correlated to the selected transmission station.

In the wireless communication system of the present invention, it is preferable that the upper transmission station allocate the downlink control channel for each terminal to part of the predetermined data-channel region thereof based on a sequence initial value parameter of the demodulation reference signal for each transmission station or a sequence initial value parameter of a channel state information reference signal for each transmission station.

The present invention is directed to a terminal including a first receiver part which receives information, representing correspondence between a partial region of a data-channel region allocated with a downlink control channel and a parameter used to demodulate the downlink control channel, in connection with a plurality of parameters; a second receiver part which receives the downlink control channel allocated to the partial region of the data-channel region; and a decoding part which decodes the downlink control channel based on a demodulation reference signal generated by a first parameter selected from among a plurality of parameters or which decodes the downlink control channel based on a demodulation reference signal generated by a second parameter selected from among a plurality of parameters when the decoding part fails to perform decoding based on the first parameter.

In the terminal of the present invention, it is preferable that the decoding part decode the downlink control channel based on the first parameter serving as a parameter used to generate a channel state information reference signal, or the decoding part decode the downlink control channel based on the second parameter serving as a parameter used to generate the channel state information reference signal when the decoding part fails to perform decoding based on the first parameter.

In the terminal of the present invention, it is preferable that the decoding part select the transmission station based on a signal-to-interference ratio or reception power of the demodulation reference signal so as to decode the downlink control channel correlated to the selected transmission station.

In the terminal of the present invention, it is preferable that the decoding part select the transmission station based on reception intensity of a sounding reference signal for each transmission station so as to decode the downlink control channel correlated to the selected transmission station.

The present invention is directed to a transmission station including a control channel allocation part which allocates a downlink control channel to a partial region of a data-channel region based on a demodulation reference signal generated by a parameter used to demodulate the downlink control channel so as to correlate the partial region to each of parameters used to demodulate the downlink control channel; and a transmitter which transmits information, representing correspondence between the partial region and the parameter used to modulate the downlink control channel in connection with a plurality of parameters.

In the transmission station of the present invention, it is preferable that the control channel allocation part allocates the downlink control channel to the partial region of the data-channel region based on a parameter used to generate a channel state information reference signal serving as a parameter used to demodulate the downlink control channel.

The present invention is directed to a wireless communication program adapted to a wireless communication system including an upper transmission station and a lower transmission station, each serving as a transmission station, and a terminal serving as a reception station. The wireless communication program causes a computer of the upper transmission station to implement a procedure of allocating a downlink control channel for each terminal to part of a predetermined data-channel region ascribed to the lower transmission station based on a demodulation reference signal for each transmission station, transmitting the allocation result to the lower transmission station, and transmitting the downlink control channel for each terminal, disposed at part of the predetermined data-channel region thereof, based on the allocation result. The wireless communication program causes a computer of the lower transmission station to implement a procedure of transmitting the downlink control channel for each terminal, disposed at part of the predetermined data-channel region thereof, based on the allocation result. The wireless communication program causes a computer of the terminal to implement a procedure of decoding the downlink control channel based on the demodulation reference signal.

Additionally, the wireless communication program of the present invention causes a computer of a terminal to implement a procedure of selecting a first parameter from among a plurality of parameters used to demodulate a downlink control channel allocated to a partial region of a data-channel region; a procedure of decoding the downlink control channel based on a demodulation reference signal generated by the first parameter; and a procedure of selecting a second parameter from among the plurality of parameters and decoding the downlink control channel based on a demodulation reference signal generated by the second parameter when it is impossible to perform decoding based on the first parameter.

Moreover, the wireless communication program of the present invention causes a computer of a transmission station to implement a procedure of allocating a downlink control channel to a partial region of a data-channel region based on a demodulation reference signal generated by a parameter used to demodulate the downlink control channel while establishing correspondence between the partial region and each of parameters used to demodulate the downlink control channel, and a procedure of transmitting information, representing correspondence between the partial region and the parameter used to demodulate the downlink control channel, in connection with a plurality of parameters.

Advantageous Effects of Invention

A master transmission station allocates a downlink control channel for each terminal to part of a predetermined data channel region based on a demodulation reference signal for each transmission station. Thus, it is possible for a wireless communication system to prevent a reduction of throughput of data channels without causing deficiencies of capacities in PDCCH according to the standard up to LTE Rel. 10.

BRIEF DESCRIPTION OF DRAWINGS

FIG. 2 is a block diagram showing an example of configurations of a master transmission station, a slave transmission station, and a terminal.

FIG. 3 is a table describing "Table 5.3.3.1.5C-1" of Non-Patent Literature Document 1 in the first embodiment of the present invention.

FIG. 7A shows an example of table data used to notify an ePDCCH-potential region in the second embodiment of the present invention.

FIG. 7B shows an example of table data used to notify an ePDCCH-potential region in the second embodiment of the present invention.

FIG. 8 is a sequence diagram showing a second example of an operation procedure of the wireless communication system according to the second embodiment of the present invention.

DESCRIPTION OF EMBODIMENTS

First Embodiment

The first embodiment of the present invention will be described in detail with reference to the drawings.

Hereinafter, PDCCH according to the standard up to LTE Rel. 10 will be referred to as "legacy PDCCH".

Figure 1:
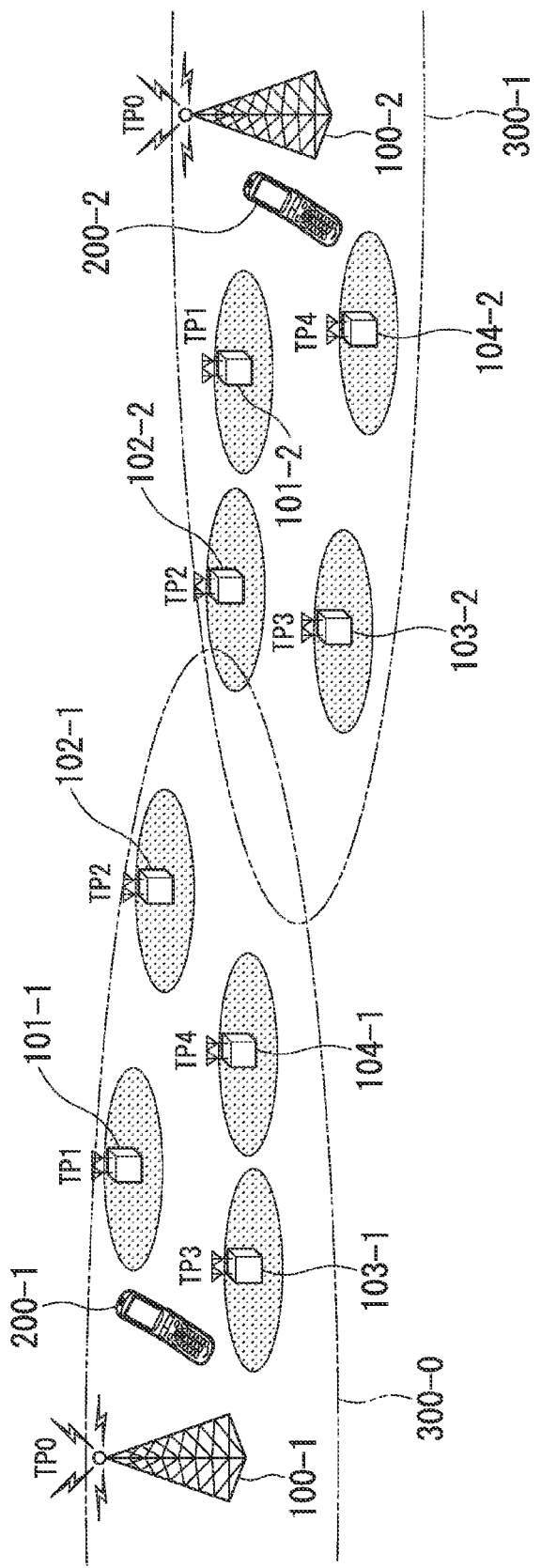
FIG. 1 is a drawing showing an example of a configuration of a wireless communication system according to the first embodiment of the present invention.

FIG. 1 shows an example of a configuration of a wireless communication system. The wireless communication system includes an upper transmission station 100-1 (Upper Power Node) (Transmission Point 0: TP0), lower transmission stations 101-1 to 104-1 (Lower Power Node) (TP1 to TP4), and a terminal 200-1. The lower transmission stations 101-1 to 104-1 share identification (i.e. a cell ID0) of a cell 300-0 of the upper transmission station 100-1.

The wireless communication system may further include other upper transmission stations, other lower transmission stations sharing cell IDs of other upper transmission stations, and other terminals. For example, the wireless communication system may include an upper transmission station 100-2, lower transmission stations 101-2 to 104-2, and a terminal 200-2. The lower transmission stations 101-2 to 104-2 shares identification (i.e. a cell ID1) of a cell 300-1 of the upper transmission station 100-2.

Since the wireless communication system has the same configuration for each cell ID of each upper transmission station, the following description solely refers to the cell 300-0, the upper transmission station 100-1, the lower transmission stations 101-1 to 104-1, and the terminal 200-1. The following description refers to symbols while omitting hyphens attached to symbols.

The wireless communication system may further include plenty of upper transmission stations 100. Similarly, it is unnecessary to limit the foregoing numbers of the lower transmission stations 101 to 104 and the terminal 200.

The upper transmission station 100 and the lower transmission stations 101 to 104 configuring a group of transmission stations (TP Group) are identified using parameters used to generate reference signals (RS) of channel state information (Channel Estimation State Reference Signal: CSI).

FIG. 2 is a block diagram showing an example of configurations of the upper transmission station, the lower transmission stations, and the terminal. First, an example of the configuration of the upper transmission station will be described. The upper transmission station 100 includes a control channel allocation part 110, a data channel allocation part 120, and a transmitter-receiver part 130.

The data channel allocation part 120 allocates to each terminal radio resources of a data channel region (PDSCH).

The transmitter-receiver part 130 notifies the terminal 200 of a parameter Y (which will be described later with reference to Equation (1)) by way of upper layer signaling. For example, the transmitter-receiver 130 may notify the terminal 200 of the value of a parameter Y by way of the legacy PDCCH serving as upper layer signaling.

The transmitter-receiver 130 instructs the terminal 200 to notify (or feed back) a performance index representing the measurement result of reception power or a signal-to-interference ratio with respect to a channel state information reference signal (CSI-RS) transmitted from each transmission station. Alternatively, the transmitter-receiver part 130 may instruct the terminal 200 to notify a performance index representing reception intensity of an uplink sounding reference signal for each transmission station.

The transmitter-receiver part 130 receives from the terminal 200 a performance index representing the measurement result of reception power or a signal-to-interference ratio with respect to a channel state information reference signal (CSI-RS).

The control channel allocation part 110 determines a different parameter Y for each transmission station (TP), representing a sequence initial value of a channel state information reference signal (CSI-RS), in order to identify the lower transmission stations 101 to 104. That is, the parameter Y indicates an eigenvalue specific to each transmission station (TP-specific). A sequence initial value $C_{init}$ of a channel state information reference signal is given by Equation (1).

[Equation 1]

$$C_{init}=2^{10}\cdot(7\cdot(n_s+1)+l+1)\cdot(2\cdot Y+1)+2\cdot Y+N_{CP} \quad (1)$$

In the above, $n_s$ denotes identification of a slot. Additionally, l denotes identification (ID) of Orthogonal Frequency Division Multiplexing (OFDM). Moreover, $N_{CP}$ denotes a cyclic prefix (CP) length.

The information of Equation (1) is stored in a storage unit (not shown) of the upper transmission station 100 in advance. Additionally, the information of Equation (1) is stored in a storage unit (not shown) of the terminal 200 in advance.

For example, the control channel allocation part 110 allocates a parameter Y having value 0 to the upper transmission station 100 such that CSI-RS will be transmitted via sub-frames 0, 5, 10, 15, . . . according to CSI-RS setting (Configuration) 0. Additionally, the control channel allocation part 110 allocates a parameter Y having value 1 to the lower transmission station 101 such that CSI-RS will be transmitted via sub-frames 1, 6, 11, 16, . . . according to CSI-RS setting 1. The control channel allocation part 110 allocates a parameter Y having value 2 to the lower transmission station 102 such that CSI-RS will be transmitted via sub-frames 2, 7, 12, 17, . . . according to CSI-RS setting 2. The control channel allocation part 110 allocates a parameter Y having value 3 to the lower transmission station 103 such that CSI-RS will be transmitted via sub-frames 3, 8, 13, 18, . . . according to CSI-RS setting 3. The control channel allocation part 110 allocates a parameter Y having value 4 to the lower transmission station 104 such that CSI-RS will be transmitted via sub-frames 4, 9, 14, 19, . . . according to CSI-RS setting 4. In this connection, the transmission timings of CSI-RS may overlap with each other among transmission stations.

The control channel allocation part 110 allocates to each terminal ePDCCH, which is used to notify the allocation result of the data channel allocation part 120 allocating the predetermined data to each terminal and which occupies part of radio resources of a data channel region.

The control channel allocation part 110 may solely allocate ePDCCH radio resources to an allocatable region of ePDCCH (i.e. an ePDCCH Potential Region) (hereinafter, referred to as an "ePDCCH-potential region") within radio resources ascribed to the top N (where N denotes a predetermined integer equal to or above 1) transmission stations having higher performance indexes. Additionally, the control channel allocation part 110 may determine the number N in consideration of traffic variations.

The control channel allocation part 110 generates a demodulation reference signal (DMRS) (hereinafter, referred to as an "ePDCCH demodulation reference signal") used to decode (blind-decoding) ePDCCH based on a parameter Y (see Equation (1)) of a sequence initial value of a channel state information reference signal (CSI-RS) for each transmission station. A sequence initial value $C_{init}$ of an ePDCCH demodulation reference signal is given by Equation (2).

[Equation 2]

$$C_{init} = (n_s/2+1) \cdot (2Z+1) \cdot 2^{16} + n_{SCID} \qquad (2)$$

In the above, $n_s$ denotes identification of a slot. As $n_{SCID}$, it is possible to use a parameter $n_{SCID}$ described in "Table 5.3.3.1.5C-1" of Non-Patent Literature Document 1. That is, the upper transmission station 100 notifies the terminal 200 of $n_{SCID}$ which is set to value 0 or 1 (a fixed value) in advance.

The information of Equation (2) is stored in a storage unit (not shown) of the upper transmission station 100 in advance. Additionally, the information of Equation (2) is stored in a storage unit (not shown) of the terminal 200 in advance.

FIG. 3 shows a table described in "Table 5.3.3.1.5C-1" of Non-Patent Literature Document 1. The "Table 5.3.3.1.5C-1" shows a plurality of candidate value patterns (Value) with respect to parameters (Message) used to generate a sequence initial value $C_{init}$ of a demodulation reference signal (DMRS) specific to each terminal (UE-Specific). In Equation (2), $n_{SCID}$ is determined in a similar manner of $n_{SCID}$ described in "Table 5.3.3.1.5C-1".

Referring back to FIG. 2, an example of the configuration of the upper transmission station will be described continuously. The control channel allocation part 110 determines a parameter Z, relating to a sequence initial value of an ePDCCH demodulation reference signal, uniquely based on a parameter Y. For example, the control channel allocation part 110 determines a parameter Z of a sequence initial value of an ePDCCH demodulation reference signal to be identical to a parameter Y. That is, the parameter Z is a value specific to each transmission station (TP-Specific), and therefore N candidate values can be applied to the parameter Z.

Since the parameter Z is identical to the parameter Y, it is unnecessary for the control channel allocation part 110 to notify the terminal 200 of the parameter Z. Since the parameter Z is identical to the parameter Y, it is possible for the terminal 200 to know of the parameter Z before receiving ePDCCH without being notified of the parameter Z.

The control channel allocation part 110 may allocate ePDCCH of the terminal 200 to radio resources of an ePDCCH-potential region based on performance indexes of all the transmission stations located in the cell 300. Herein, it is possible to use the parameter Y in order to identify each transmission station. The transmitter-receiver part 130 notifies the terminal 200 of the allocation result of radio resources allocated to an ePDCCH-potential region by way of upper layer signaling.

The terminal 200 performs blind decoding on ePDCCH for each sub-frame, transmitted from a high-rank transmission station with a higher performance index. On the supposition that the order of transmission stations having higher reception power of channel state information reference signals represents a series of the lower transmission station 103>lower transmission station 104>lower transmission station 102>upper transmission station 100>lower transmission station 101, the control channel allocation part 110 carries out the following operation.

For example, when the number N of transmission stations having higher performance indexes is set to 1 in advance, the control channel allocation part 110 allocates an ePDCCH-potential region of the lower transmission station 103 (TP3) having the highest performance index to ePDCCH of the terminal 200. In this case, ePDCCH is subjected to decoding (blind decoding) with the terminal 200 by use of the sequence initial value Z=3 of an ePDCCH demodulation reference signal.

When the number N of transmission stations having higher performance indexes is set to 2, for example, the control channel allocation part 110 allocates the ePDCCH-potential region of the lower transmission station 103 (TP3) having the highest performance index to the ePDCCH of the terminal 200. In this case, ePDCCH is subjected to decoding (blind decoding) with the terminal 200 by use of the sequence initial value Z=3 of an ePDCCH demodulation reference signal.

When the foregoing allocation cannot be completed, the control channel allocation part 110 allocates the ePDCCH-potential region of the lower transmission station 104 (TP4) having the second highest performance index to the ePDCCH of the terminal 200. In this case, ePDCCH is subjected to decoding (blind decoding) with the terminal 200 by use of the sequence initial value Z=4 of an ePDCCH demodulation reference signal.

Next, an example of the configuration of the terminal will be described.

The terminal 200 is configured to synchronize with the cell 300 while the upper transmission station 100 (TP0) serves as a serving sector. The terminal 200 includes a measurement part 210, a decoding part 220, and a transmitter-receiver part 230.

The measurement part 210 measures reception power or a signal-to-interference ratio with respect to a channel state information reference signal (CSI-RS) transmitted from each transmission station. The measurement part 210 notifies the control channel allocation part 110 of the upper transmission station 100 of a performance index representing the measurement result of reception power or a signal-to-interference ratio with respect to a channel state information reference signal (CSI-RS) transmitted from each transmission station. Herein, the notification method (or the feedback method) has been determined in advance.

The transmitter-receiver part 130 of the upper transmission station 100 notifies the transmitter-receiver part 230 of a parameter Y via upper layer signaling.

The decoding part 220 tries to perform decoding (blind decoding) on ePDCCH with respect to an ePDCCH-potential region of a transmission station within the top N transmission stations having higher performance indexes based on N candidate values of a parameter Z relating to a sequence initial value of an ePDCCH demodulation reference signal. Since the decoding part 220 determines the parameter Z to be identical to the parameter Y being notified before receiving ePDCCH, the decoding part 220 is able to know of the parameter Z without being directly notified of the parameter Z.

Before decoding ePDCCH, the decoding part 220 generates an ePDCCH demodulation reference signal based on N candidate values of the parameter Z. The decoding part 220 decodes ePDCCH with respect to a transmission station showing a performance index equal to or above a predetermined threshold P based on an ePDCCH demodulation reference signal.

The decoding part 220 may carry out the following operation in order to reduce a search count for blind decoding. In this connection, it is stipulated between the upper transmission station 100 and the terminal 200 in advance that ePDCCH radio resources are solely allocated to an ePDCCH-potential region of a transmission station ranked within the top N transmission stations having higher performance indexes.

Before decoding ePDCCH, the decoding part 220 generates an ePDCCH demodulation reference signal based on a parameter Z. The decoding part 220 may carry out decoding on ePDCCH based on ePDCCH demodulation reference signals in the descending order of transmission stations within the top N transmission stations having higher performance indexes.

Before decoding ePDCCH, the decoding part 220 may limit ePDCCH aggregation levels based on the number N of transmission stations corresponding to the top N transmission stations having higher performance indexes. When the number N of transmission stations having higher performance indexes is set to 1 in advance, for example, the decoding part 220 supports four types of aggregation levels of ePDCCH equal to 1, 2, 4, and 8. When the number N of transmission stations having higher performance indexes is set to 2 in advance, the decoding part 220 supports two types of aggregation levels of ePDCCH equal to 2 and 4. When the number N of transmission stations having higher performance indexes is set to 1 in advance, the decoding part 220 solely supports one type of an aggregation level of ePDCCH equal to 4.

Next, an example of the operation procedure of the wireless communication system will be described.

Figure 4:
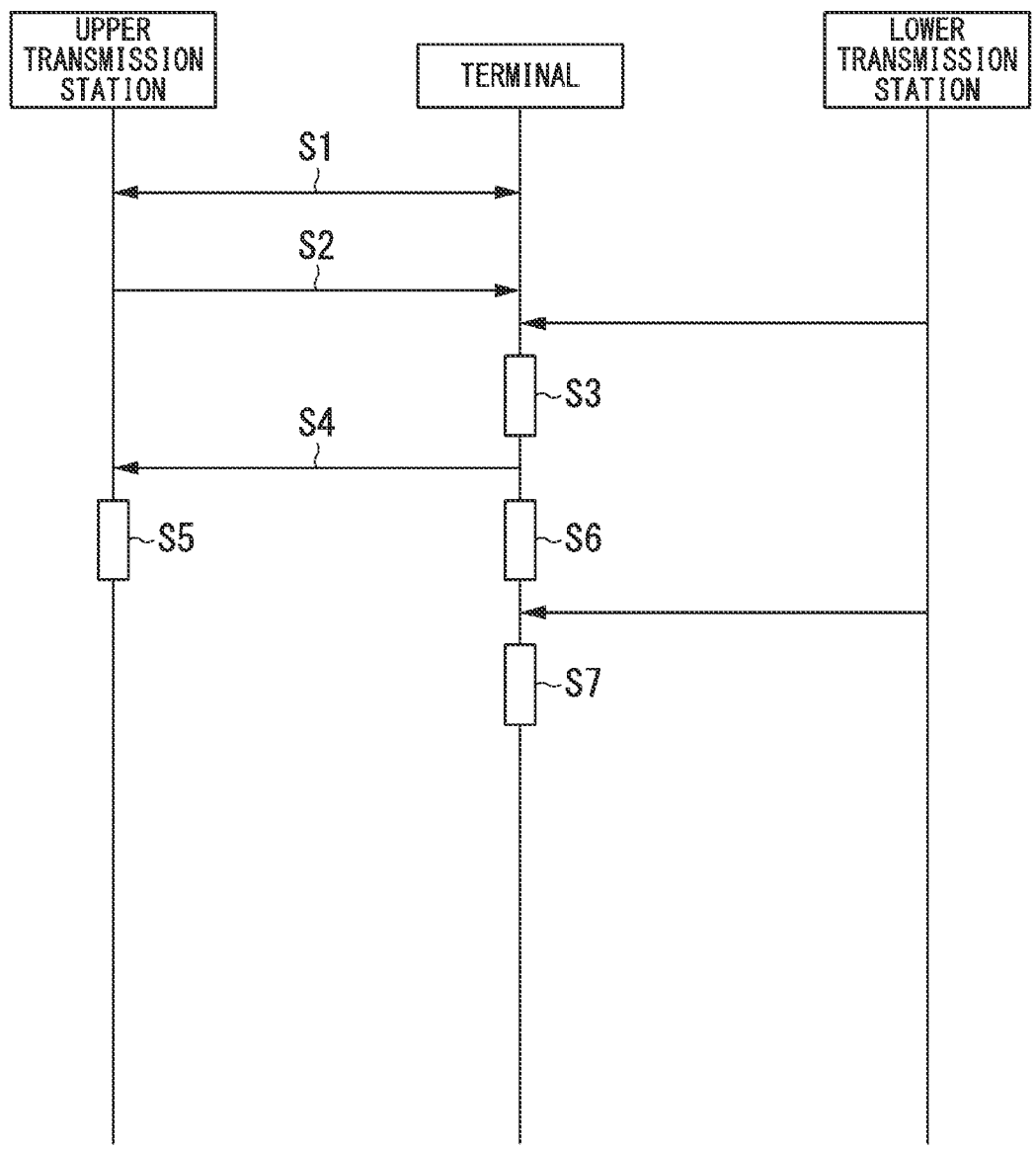
FIG. 4 is a sequence diagram showing a first example of an operation procedure of the wireless communication system according to the first embodiment of the present invention.

FIG. 4 is a sequence diagram showing a first example of the operation procedure of the wireless communication system. In FIG. 4, it is stipulated between the upper transmission station 100 and the terminal 200 in advance that ePDCCH radio resources are solely allocated to an ePDCCH-potential region of a transmission station within the top N transmission stations having higher performance indexes.

The terminal 200 is configured to synchronize with the cell 300 while the upper transmission station 100 serves as a serving sector (Step S1).

For example, the control channel allocation part 110 of the upper transmission station 100 allocates a parameter Y having value 0 to the upper transmission station 100. For example, the control channel allocation part 110 allocates a parameter Y having value 1 to the lower transmission station 101. For example, the control channel allocation part 110 allocates a parameter Y having value 2 to the lower transmission station 102. For example, the control channel allocation part 110 allocates a parameter Y having value 3 to the lower transmission station 103. For example, the control channel allocation part 110 allocates a parameter Y having value 4 to the lower transmission station 104.

The transmitter-receiver part 130 notifies the terminal 200 of a parameter Y via upper layer signaling. The transmitter-receiver part 130 instructs the terminal 200 to notify a performance index representing the measurement result of reception power or a signal-to-interference ratio with respect to a channel state information reference signal (CSI-RS) transmitted from each transmission station (step S2).

The transmitter-receiver part 130 of the upper transmission station 100 notifies the transmitter-receiver part 230 of the terminal 200 of a parameter Y via upper layer signaling. The measurement part 210 measures reception power or a signal-to-interference ratio with respect to a channel state information reference signal transmitted from each transmission station (step S3).

The measurement part 210 notifies the control channel allocation part 110 of the upper transmission station 100 of a performance index representing the measurement result of reception power or a signal-to-interference ratio with respect to a channel state information reference signal transmitted from each transmission station by way of the predetermined notification method (or the feedback method) (step S4).

The control channel allocation part 110 allocates radio resources of a data channel region (PDSCH) to the terminal 200. The control channel allocation part 110 solely allocates an ePDCCH demodulation reference signal to an ePDCCH-potential region ascribed to each of the top N transmission stations having higher performance indexes (step S5).

The decoding part 220 generates an ePDCCH demodulation reference signal based on a parameter Z (=Y) (step S6). The decoding part 220 carries out decoding (blind decoding) on ePDCCH for each sub-frame based on an ePDCCH demodulation reference signal (step S7).

Figure 5:
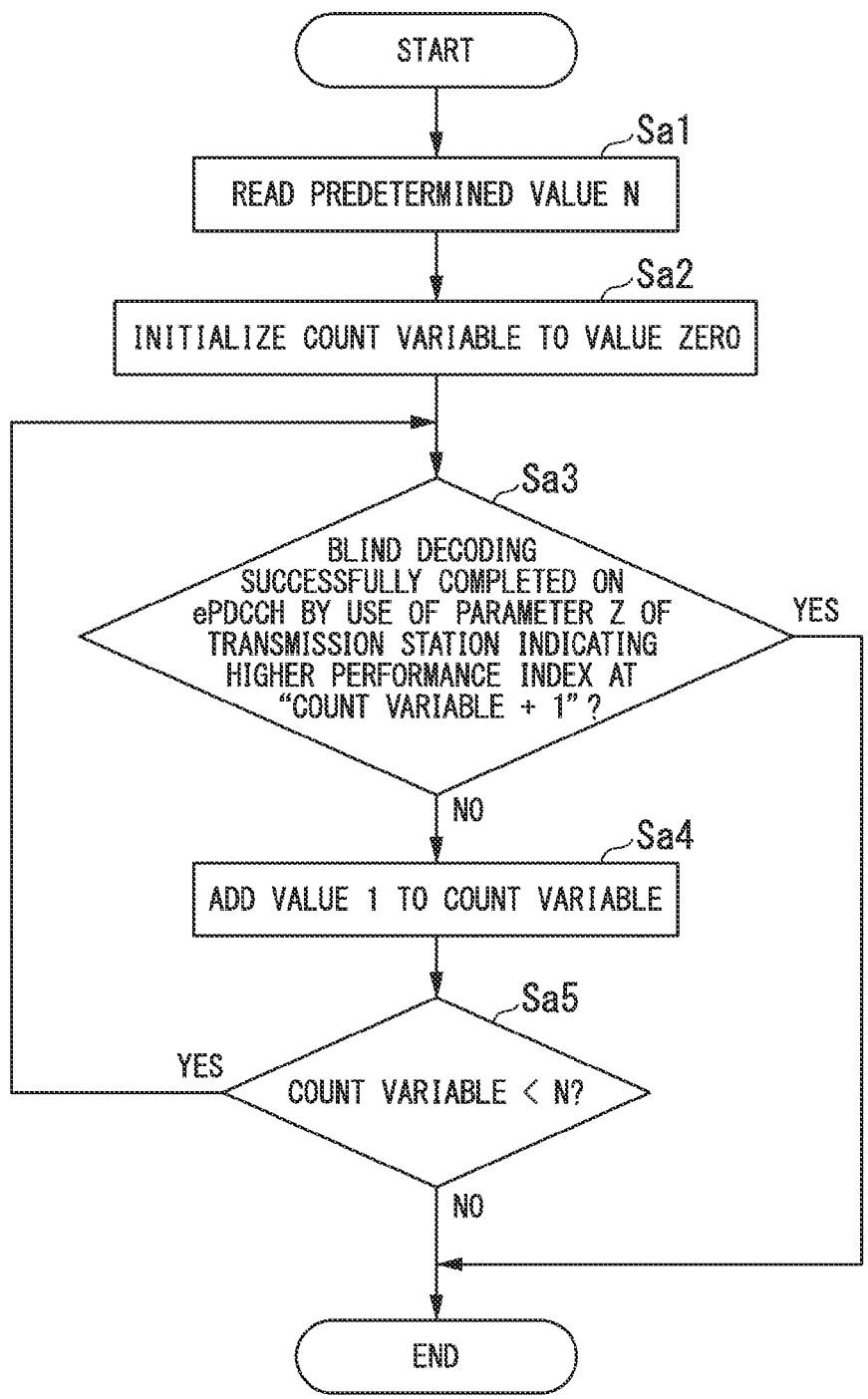
FIG. 5 is a flowchart showing an example of a procedure of decoding (blind-decoding) ePDCCH in the first embodiment of the present invention.

FIG. 5 is a flowchart showing an example of an operation procedure of decoding (blind decoding) ePDCCH. The decoding part 220 of the terminal 200 reads the number N corresponding to the number of top-rank transmission stations having higher performance indexes. For example, the decoding part 220 may read the predetermined number N from a storage unit (not shown) (step Sa1). Additionally, the decoding part 220 initializes a count variable to value 0 (step Sa2).

Using a parameter Z of a transmission station, ranked at the "count value+1" place among transmission stations having higher performance indexes, within N candidate values of the parameter Z, the decoding part 220 determines as to whether or not decoding (blind decoding) of ePDCCH can be completed successfully (step Sa3). Upon successfully completing decoding of ePDCCH (step Sa3—YES), the decoding part 220 exits the processing.

When decoding of ePDCCH can not be completed (step Sa3—NO), the decoding part 220 adds value 1 to the count variable (step Sa4). Then, the decoding part 220 determines whether or not the count variable is less than value N (step Sa5). When the count variable is not less than value N (step Sa5—NO), the decoding part 220 exits the processing. When the count variable is less than value N (step Sa5—YES), the decoding part 220 reverts to step Sa3.

As described above, in the wireless communication system including upper transmission stations and lower transmission stations, serving as transmission stations, and terminals serving as reception stations, the wireless communication system includes the upper transmission station 100 (the control channel allocation part 110) which allocates a downlink control channel (ePDCCH) for each terminal 200 to part of the predetermined data channel region (PDSCH) based on a demodulation reference signal (DMRS) for each transmission station so as to transmit the allocation result to the lower transmission stations 101 to 104 while transmitting the downlink control channel (ePDCCH) for each terminal 200 being disposed as part of the predetermined data channel region (PDSCH) based on the allocation result; the lower transmission stations 101 to 104 which transmit the downlink control channel (ePDCCH) for each terminal being disposed as part of the predetermined data channel region (PDSCH) based on the allocation result; and the terminal 200 (the decoding part 220) which performs decoding (blind decoding) on the downlink control channel (ePDCCH) based on the demodulation reference signal.

Based on the above configuration, the upper transmission station 100 allocates the downlink control channel (ePDCCH) for each terminal 200 to part of the predetermined data channel region (PDSCH) based on the demodulation reference signal (DMRS) for each transmission station. Thus, it is possible for the wireless communication system to prevent a reduction of the data-channel throughput without causing deficiencies in capacities of PDCCH according to the standard up to LTE Rel. 10.

The terminal 200 (the decoding part 220) generates the demodulation reference signal (DMRS) (i.e. the sequence initial value parameter Z=Y) based on the sequence initial value parameter (Y) of the channel state information reference signal (CSI-RS) for each transmission station (see Equation (1)), and then decodes the downlink control channel (ePDCCH) based on the generated demodulation reference signal.

Additionally, the terminal 200 (the decoding part 220) selects a transmission station (any one of the upper transmission station 100 and the lower transmission stations 101 to 104) based on reception intensity or a signal-to-interference ratio of the demodulation reference signal (DMRS), and then decodes the downlink control channel (ePDCCH) with respect to the selected transmission station.

Moreover, the terminal 200 (the decoding part 220) selects a transmission station (any one of the upper transmission station 100 and the lower transmission stations 101 to 104) based on reception intensity of the sounding reference signal (uplink) for each transmission station, and then decodes the downlink control channel (ePDCCH) with respect to the selected transmission station.

In the wireless communication system including upper transmission station and lower transmission stations, serving as transmission stations, and terminals serving as reception stations, the wireless communication program causes the computer of the upper transmission station 100 (the control channel allocation part 110) to implement a procedure of allocating the downlink control channel (ePDCCH) for each terminal 200 to part of the predetermined data-channel region (PDSCH) based on the demodulation reference signal (DMRS) for each transmission station, transmitting the allocation result to the lower transmission stations 101 to 104, and transmitting the downlink control channel (ePDCCH) for each terminal 200 being disposed as part of the predetermined data channel (PDSCH) based on the allocation result; a procedure of transmitting the downlink control channel (ePDCCH) for each terminal 200 being disposed as part of the predetermined data-channel region (PDSCH), to the computers of the lower transmission stations 101 to 104 based on the allocation result; and a procedure of decoding the downlink control channel (ePDCCH) with the computer of the terminal 200 (the decoding part 220) based on the demodulation reference signal.

To identify each transmission station, it is possible to use a sequence initial value parameter X (TP-specific, UE-specific) of a demodulation reference signal (DMRS) used to demodulate the predetermined data allocated to the data channel region (PDSCH). The sequence initial value $C_{init}$ of the demodulation reference signal (DMRS) used to demodulate the predetermined data allocated to the data channel region is given by Equation (3).

[Equation 3]

$$C_{init}=(n_s/2+1)\cdot(2X+1)\cdot 2^{16}+n_{SCID} \quad (3)$$

In the above, $n_s$ denotes identification of a slot. As $n_{SCID}$, it is possible to use a parameter $n_{SCID}$ described in "Table 5.3.3.1.5C-1" (see FIG. 3) of Non-Patent Literature Document 1. That is, $n_{SCID}$ is set to value 0 or 1.

As described above, the upper transmission station 100 allocates the downlink control channel (ePDCCH) for each terminal to part of the predetermined data channel region (PDSCH) ascribed thereto based on a sequence initial value parameter X of a demodulation reference signal (DMRS) for each transmission station (TP-specific) or for each terminal (UE-specific) or a sequence initial value parameter Y of a channel state information reference signal for each transmission station.

Second Embodiment

The second embodiment differs from the first embodiment in that the second embodiment supports base station cooperation (Coordinated Multi-Point: CoMP). The following description solely refers to differences between the first embodiment and the second embodiment.

As similar to the description of the first embodiment, the following description solely refers to the cell 300-0, the upper transmission station 100-1, the lower transmission stations 101-1 to 104-1, and the terminal 200-1. Additionally, the following description refers to symbols while omitting hyphens affixed to symbols.

The terminal 200 is able to switch over transmission stations serving as communication destinations in units of sub-frames based on "Dynamic Point Selection: DPS" according to the base station cooperation scheme. The wireless communication system supporting the base station cooperation may define various sets of transmission stations such as "CoMP Cooperating Set", "CoMP Resource Management Set", and "CoMP Measurement Set".

The "CoMP Cooperating Set" denotes a set of transmission stations (TP) which can share resource allocation information with each other. The "CoMP Cooperating Set" is determined in advance by network operators as the network deployment.

Herein, "CoMP Resource Management Set" denotes a set of transmission stations (TP) whose reception signal levels are measured with the terminal 200. For example, it is possible to measure reception signal levels based on channel state information reference signals (CSI-RS). The upper transmission station 100 determines "CoMP Resource Management Set" based on the position of the terminal 200.

Additionally, "CoMP Measurement Set" denotes a set of transmission stations (TP) whose channel qualities are measured. For example, the upper transmission station 100 determines "CoMP Measurement Set" based on a reception signal level of a channel state information reference signal (CSI-RS) serving as channel quality.

For example, the information representing resources for use in channel state information reference signals (CSI-RS) includes the information (e.g. transmission cycles, offset values) representing sub-frames used to transmit channel state information reference signals, the information representing frequencies used to transmit channel state information reference signals, the information representing antenna ports used to transmit channel state information, the information representing power of transmitting channel state information reference signals, and sequence initial value parameters Y of channel state information reference signals (see Equation (1)).

The following description refers to "parameter Y0" representing a parameter Y (see Equation (1)) allocated to the upper transmission station 100, "parameter Y1" representing a parameter Y allocated to the lower transmission station 101, "parameter Y2" representing a parameter Y allocated to the lower transmission station 102, "parameter Y3" representing a parameter Y allocated to the lower transmission station 103, and "parameter Y4" representing a parameter Y allocated to the lower transmission station 104.

In FIG. 1, "CoMP Cooperating Set" denotes a set of the upper transmission station 100 and the lower transmission stations 101 to 104. Additionally, "CoMP Resource Management Set" denotes a set of upper transmission stations and lower transmission stations positioned within the predetermined first distance from the terminal 200, i.e. a set of the upper transmission station 100, the lower transmission station 101, and the lower transmission station 103. Moreover, "CoMP Measurement Set" denotes a set of lower transmission stations positioned within the predetermined second distance from the terminal 200, i.e. a set of the lower transmission station 101 and the lower transmission station 103.

The sequence initial value parameter Z (see Equation (2)) of the ePDCCH demodulation reference signal (DMRS) is selected from "CoMP Measurement Set", i.e. the parameter Y1 correlated to the lower transmission station 101 and the parameter Y3 correlated to the lower transmission station 103. When the parameter $n_{SCID}$ of Equation (2) is set to value 0, for example, the control channel allocation part 110 of the upper transmission station 100 (see FIG. 2) selects the parameter Y1, which is set to the parameter Z. When the parameter $n_{SCID}$ of Equation (2) is set to value 1, the control channel allocation part 110 of the upper transmission station 100 selects the parameter Y3, which is set to the parameter Z. In this connection, it is possible to reversely handle the parameters Y1 and Y3.

Additionally, it is possible to select the parameter Z from a plurality of parameters Y based on the predetermined condition. That is, it is possible to produce three or more candidate values for use in the parameter Z.

Figure 6A:
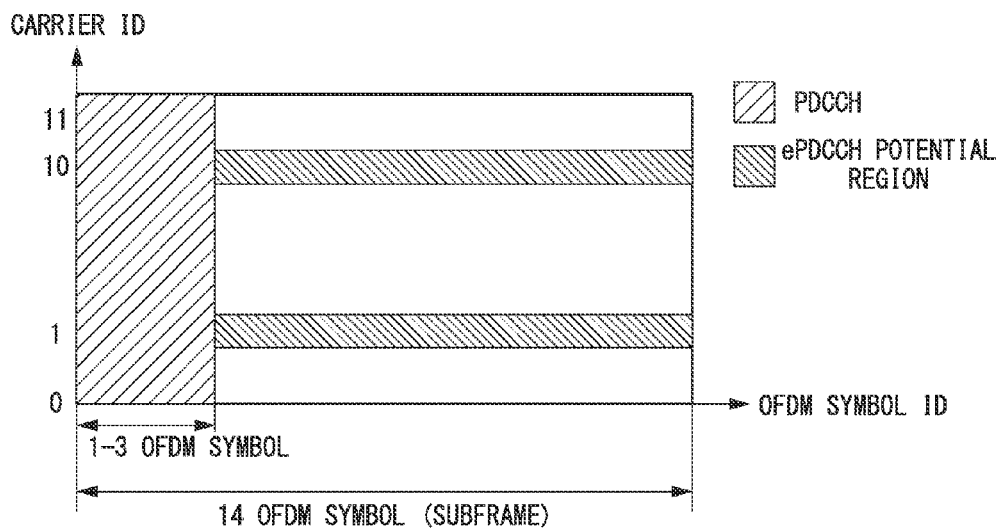
FIG. 6A is a drawing showing an example of disposing an ePDCCH-potential region in the second embodiment of the present invention.
Figure 6B:
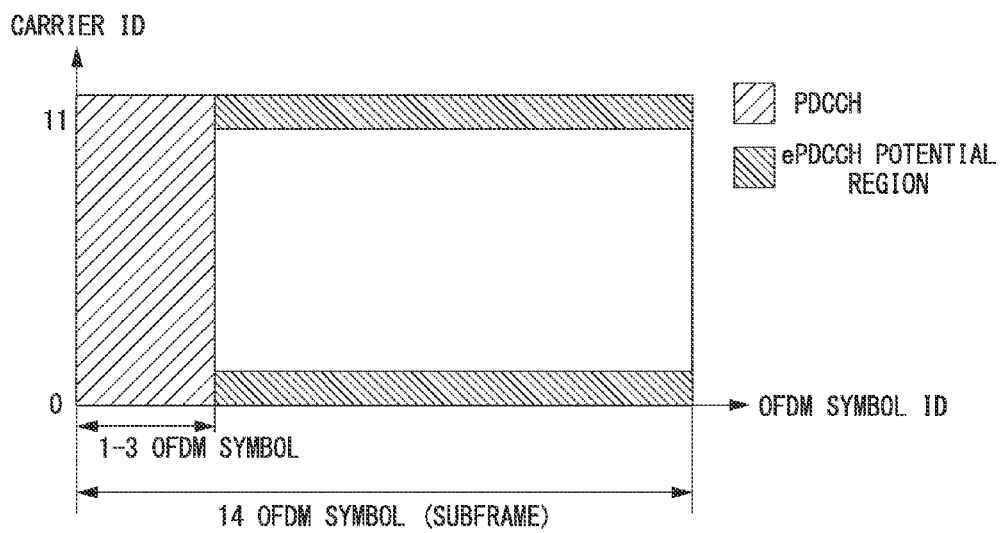
FIG. 6B is a drawing showing an example of disposing an ePDCCH-potential region in the second embodiment of the present invention.

FIGS. 6A and 6B show examples of disposing ePDCCH-potential regions. The horizontal axis represents OFDM symbol IDs while the vertical axis represents carrier IDs. Downlink control channels (PDCCH) according to the standard up to LTE Rel. 10 are disposed in regions with OFDM symbol IDs 1 to 3. In contrast, ePDCCH-potential regions are allocated to radio resources ascribed to part of data channel regions (i.e. regions other than regions with OFDM symbol IDs 1 to 3 among 140 OFDM symbols).

It is possible to dispose ePDCCH-potential regions at different regions in units of transmission stations. FIG. 6A shows an example of allocation in which the upper transmission station 100 allocates ePDCCH-potential regions to a region denoted by carrier ID1 and a region denoted by carrier ID10. This allocation will be referred to as "allocation A". FIG. 6B shows an example of allocation in which the upper transmission station 100 allocates ePDCCH-potential regions to a region denoted by carrier ID0 and a region denoted by carrier ID11. This allocation will be referred to as "allocation B".

FIGS. 7A and 7B show examples of table data used to notify ePDCCH-potential regions. The table data used to notify ePDCCH-potential regions includes information representing the correspondence between parameters Y and ePDCCH-potential regions with respect to two or more parameters Y. For example, the parameter Y may be unique to each transmission station (i.e. each cell ID) or each set of antennas (i.e. each antenna set ID). Herein, the antenna set may be configured of a plurality of antennas attached to the same transmission station or a plurality of antennas attached to different transmission stations.

FIG. 7A shows an example of correspondence in which the control channel allocation part 110 of the upper transmission station 100 sets the parameter Y1 to "allocation A" while setting the parameter Y3 to "allocation B". FIG. 7B shows an example of correspondence in which the control channel allocation part 110 of the upper transmission station 100 sets the parameter A to "allocation A" while setting the parameter Y3 to "no allocation". Herein, no allocation indicates that no ePDCCH-potential region is allocated to any radio resources by use of the parameter Y3. In this case, the ePDCCH-potential region may exist in radio resources.

The table data used to notify ePDCCH-potential regions may include the correspondence between parameters Y and ePDCCH-potential regions with respect to three or more parameters Y.

The transmitter-receiver part 130 of the upper transmission station 100 (see FIG. 2) notifies the terminal 200 of table data used to notify ePDCCH-potential regions by way of upper layer signaling (e.g. RRC (Radio Resource Control)). Herein, the transmitter-receiver 130 notifies the terminal 200 of table data used to notify ePDCCH-potential regions before the lower transmission station notifies the terminal 200 of ePDCCH (e.g. several milliseconds to several tens of milliseconds before).

The transmitter-receiver 230 of the terminal 200 (see FIG. 2) receives table data used to notify ePDCCH-potential regions. The transmitter-receiver 230 receives ePDCCH from the lower transmission station included in "CoMP Measurement Set". The decoding part 220 of the terminal 200 (see FIG. 2) sets each of the selected parameters Y, included in table data, to the parameter Z so as to perform decoding (blind decoding) on ePDCCH according to Equation (2).

Upon being notified of the table data shown in FIG. 7A, the terminal 200 performs decoding (blind decoding) on ePDCCH based on the information representing the parameter Y1 and allocation A. When the terminal 200 fails to perform decoding based on the information representing the parameter Y1 and allocation A, the terminal 200 performs decoding (blind decoding) on ePDCCH based on the information representing the parameter Y3 and allocation B.

Upon being notified of the table data shown in FIG. 7B, the terminal 200 decodes ePDCCH based on the information representing the parameter Y1 and allocation A. Since the table data shown in FIG. 7B indicates (no allocation) that ePDCCH is not allocated to radio resources of the lower transmission station 103, it is possible for the terminal 200 to reduce the number of times to perform decoding (blind decoding).

Next, the operation procedure of the wireless communication system will be described.

FIG. 8 is a sequence diagram showing a second example of the operation procedure of the wireless communication system. The transmitter-receiver part 130 of the upper transmission station 100 (see FIG. 2) notifies the terminal 200 of the information representing "CoMP Resource Management Set" via upper layer signaling. For example, "CoMP Resource Management Set", i.e. the information representing the upper transmission station 100, the lower transmission station 101, and the lower transmission station 103, indicates a set of parameter Y0, parameter Y1, and parameter Y3 (step Sb1). For example, the step Sb1 is executed in step S2 in the first example of the operation procedure shown in FIG. 4.

The measurement part 210 of the terminal 200 (see FIG. 2) notifies the control channel allocation part 110 of the upper transmission station 100 of an performance index representing the measurement result of a signal-to-interference ratio or reception power of a channel state information reference signal (Reference Signal Received Power: RSRP), transmitted from each transmission station, by way of the predetermined notification (feedback) method (step Sb2). For example, the step Sb2 is executed in step S4 in the first example of the operation procedure shown in FIG. 4.

The transmitter-receiver part 130 of the upper transmission station 100 notifies the terminal 200 of the information representing "CoMP Measurement Set" via upper layer signaling. For example, "CoMP Measurement Set", i.e. the information representing the lower transmission station 101 and the lower transmission station 103, indicates a set of parameter Y1 and parameter Y3 (step Sb3).

The control channel allocation part 110 of the upper transmission station 100 (see FIG. 2) allocates ePDCCH to "CoMP Measurement Set", i.e. ePDCCH-potential regions of the lower transmission station 101 and the lower transmission station 103 (see FIG. 6A and FIG. 6B). The transmitter-receiver part 130 of the upper transmission station 100 notifies the terminal 200 of the table data used to notify ePDCCH-potential regions (see FIGS. 7A and 7B) via upper layer signaling (step Sb4). For example, the step Sb4 is executed in step S5 in the first example of the operation procedure shown in FIG. 4.

The transmitter-receiver 130 of the upper transmission station 100 notifies the lower transmission station 101 of the information representing the ePDCCH-potential region of the lower transmission station 101 (e.g. allocation A) via upper layer signaling. The transmitter-receiver part 130 of the upper transmission station 100 notifies the lower transmission station 103 of the information representing the ePDCCH-potential region of the lower transmission station 103 (e.g. allocation B) via upper layer signaling (step Sb5). For example, the step Sb5 is executed in step S5 in the first example of the operation procedure shown in FIG. 4.

The decoding part 220 of the terminal 200 (see FIG. 2) generates an ePDCCH demodulation reference signal (DMRS) based on the parameter Z (=Y). Herein, the decoding part 220 generates an ePDCCH demodulation reference signal based on the parameter Y1 (step Sb6).

For example, the step Sb6 is executed in step S6 in the first example of the operation procedure shown in FIG. 4.

The transmitter-receiver part 230 of the terminal 200 receives ePDCCH from the lower transmission station 101 (step Sb7).

The decoding part 220 of the terminal 200 performs decoding (blind decoding) on ePDCCH for each sub-frame based on an ePDCCH demodulation reference signal. Since the ePDCCH demodulation reference signal is generated by the parameter Y1, the decoding part 220 is able to decode ePDCCH received from the lower transmission station 101 (step Sb8). For example, the step Sb8 is executed in step S7 in the first example of the operation procedure shown in FIG. 4.

Upon additionally receiving ePDCCH from the lower transmission station 103, the decoding part 220 generates an ePDCCH demodulation reference signal based on the parameter Y3 (step Sb6). For example, the step Sb6 is executed in step S6 in the first example of the operation procedure shown in FIG. 4.

The transmitter-receiver part 230 of the terminal 200 receives ePDCCH from the lower transmission station 103 (step Sb7).

The decoding part 220 of the terminal 200 performs decoding (blind decoding) on ePDCCH for each sub-frame based on an ePDCCH demodulation reference signal. Since the ePDCCH demodulation reference signal is generated by the parameter Y3, the decoding part 220 is able to decode ePDCCH received from the lower transmission station 103 (step Sb8). For example, the step Sb8 is executed in step S7 in the first example of the operation procedure shown in FIG. 4. Thus, it is possible to support the base station cooperation (CoMP).

The operation procedure of the wireless communication system can be implemented via the following procedure.

Figure 9:
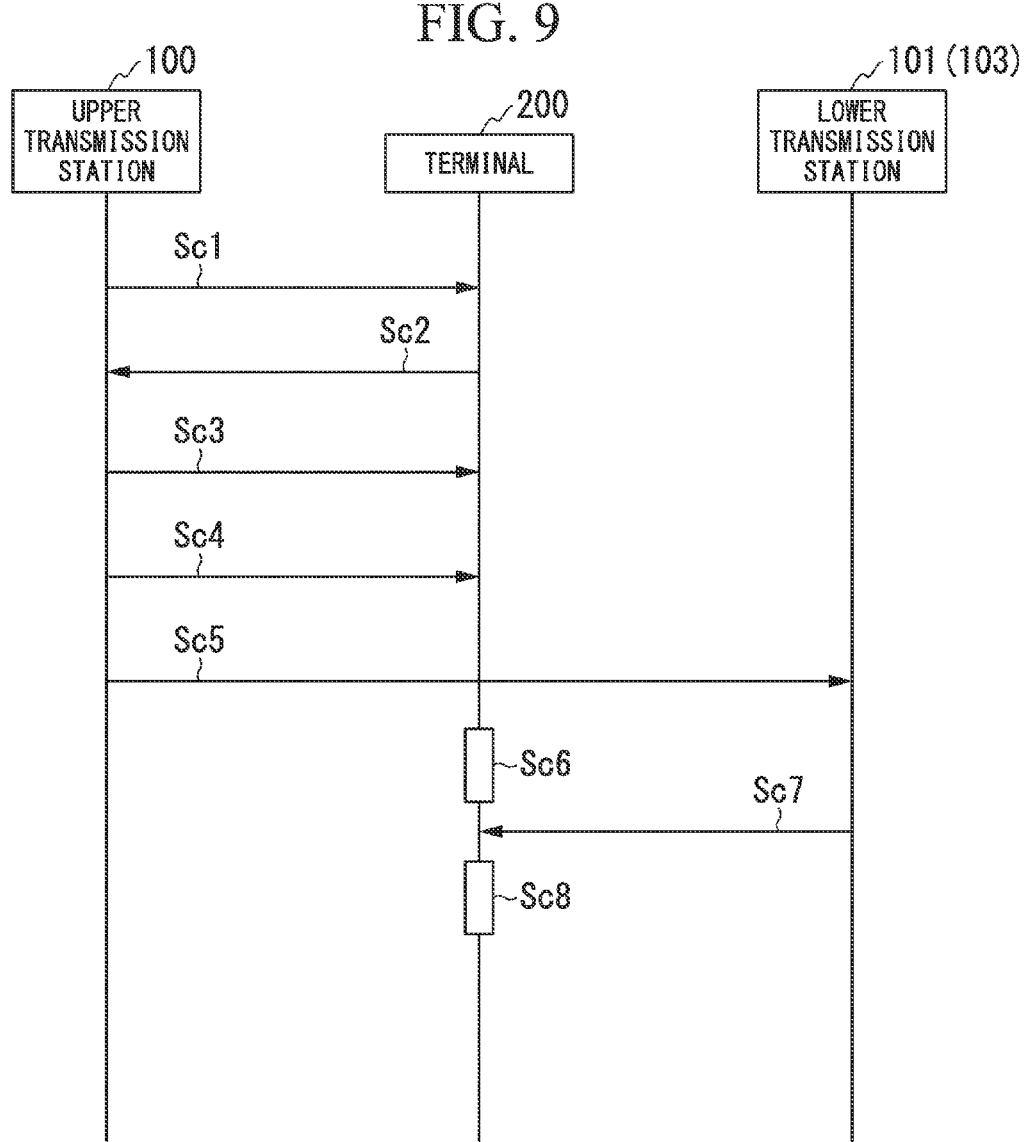
FIG. 9 is a sequence diagram showing a third example of an operation procedure of the wireless communication system according to the second embodiment of the present invention.

FIG. 9 is a sequence diagram showing a third example of the operation procedure of the wireless communication system. Herein, steps Sc1 to Sc3 are identical to steps Sb1 to Sb3 in the second example of the operation procedure shown in FIG. 8.

The control channel allocation part 110 of the upper transmission station 100 (see FIG. 2) allocates ePDCCH to "CoMP Measurement Set", i.e. the ePDCCH-potential regions of the lower transmission station 101 and the lower transmission station 103 (see FIGS. 6A and 6B). The transmitter-receiver 130 of the upper transmission station 100 notifies the terminal 200 of a sequence initial value parameter Z of an ePDCCH demodulation reference signal (see Equation (2)) via upper layer signaling (step Sc4). For example, the step Sc4 is executed in step S5 in the first example of the operation procedure shown in FIG. 4.

Step Sc5 is identical to step Sb5 in the second example of the operation procedure shown in FIG. 8.

The decoding part 220 of the terminal 200 (see FIG. 2) generates an ePDCCH demodulation reference signal based on the first value of parameter Z notified based on ePDCCH-potential region (step Sc6). For example, the step Sc6 is executed in step S6 in the first example of the operation procedure shown in FIG. 4.

Step Sc7 is identical to step Sb7 in the second example of the operation procedure shown in FIG. 8.

The decoding part 220 of the terminal 200 decodes ePDCCH for each sub-frame, received from the lower transmission station 101, based on an ePDCCH demodulation reference signal generated by the notified first value of parameter Z (step Sc8).

The transmitter-receiver part 130 of the upper transmission station 100 notifies the terminal 200 of the second value of a sequence initial value parameter Z of an ePDCCH demodulation reference signal (see Equation (2)). The decoding part 220 decodes ePDCCH for each sub-frame, received from the lower transmission station 103, based on an ePDCCH demodulation reference signal generated by the notified second value of parameter Z. Thus, it is possible to support the base station cooperation (CoMP).

As described above, the terminal 200 (see FIG. 2) includes the transmitter-receiver 230 which receives the information (e.g. see FIGS. 7A and 7B, and see the description of step Sc4 of FIG. 9) representing the correspondence between a partial region of a data channel region allocated with the downlink control channel (ePDCCH) (see FIGS. 6A and 6B) and a parameter Z (e.g. a parameter Y (see Equation (2)) used to demodulate the downlink control channel with respect to a plurality of parameters (e.g. the parameter Y1 and the parameter Y3) and which receives the downlink control channel (ePDCCH) allocated to the partial region of the data channel region; and the decoding part 220 which decodes the downlink control channel (ePDCCH) based on a demodulation reference signal (i.e. an ePDCCH demodulation reference signal) generated by the first parameter (e.g. the parameter Y1 (i.e. a cell ID and an antenna set ID) or the first value of parameter Z) selected from among a plurality of parameters or which decodes the downlink control channel (ePDCCH) based on a demodulation reference signal (i.e. an ePDCCH demodulation reference signal) generated by the second parameter (e.g. the parameter Y3 or the second value of parameter Z) selected from among a plurality of parameters when it is impossible to perform decoding based on the first parameter.

According to the above configuration, the decoding part 220 decodes the downlink control channel (ePDCCH) based on a demodulation reference signal generated by the first parameter selected from among a plurality of parameters or decodes the downlink control channel (ePDCCH) based on a demodulation reference signal generated by the second parameter selected from among a plurality of parameters when it is impossible to perform decoding based on the first parameter. Thus, it is possible for the terminal to prevent a reduction of the data-channel throughput without causing deficiencies in capacities of PDCCH according to the standard up to LTE Rel. 10, and therefore it is possible to support the base station cooperation transmission.

The decoding part 220 decodes the downlink control channel based on the first parameter (e.g. the parameter Y1) used to generate the channel state information reference signal (CSI-RS) or decodes the downlink control channel based on the second parameter (e.g. the parameter Y3) used to generate the channel state information reference signal (CSI-RS) when it is impossible to perform decoding based on the first parameter.

The decoding part 220 selects a transmission station (i.e. the upper transmission station 100 or the lower transmission stations 101 to 104) based on a signal-to-interference ratio or reception intensity of a demodulation reference signal (i.e. an ePDCCH demodulation reference signal) so as to decode the downlink control channel (ePDCCH) correlated to the selected transmission station.

The decoding part 220 selects a transmission station (i.e. the upper transmission station 100 or the lower transmission stations 101 to 104) based on reception intensity of a sounding reference signal for each transmission station, thus decoding the downlink control channel (ePDCCH) correlated to the selected transmission station.

The upper transmission station 100 (see FIG. 2) includes the control channel allocation part 110 which allocates a control channel to a partial region of a data channel region (see FIGS. 6A and 6B) based on a demodulation reference signal (an ePDCCH demodulation reference signal) generated by a parameter used to demodulate the downlink control channel (ePDCCH) so as to correlate the partial region to each of parameters Z (e.g. parameters Y) used to modulate the downlink control channel; and the transmitter-receiver 130 which transmits the information (e.g. see FIGS. 7A and 7B), representing the correspondence between the partial region and the parameter Z (e.g. the parameter Y) used to demodulate the downlink control channel (ePDCCH), in connection with a plurality of parameters (e.g. the parameters Y1 and Y3, or the first and second values of the parameter Z).

Owing to this configuration, the transmitter-receiver part 130 is able to transmit the information, representing the correspondence between the partial region and the parameter Z (e.g. the parameter Y) used to demodulate the downlink control channel (ePDCCH), in connection with a plurality of parameters (e.g. the parameters Y1 and Y3, or the first and second values of the parameter Z). Thus, it is possible for each transmission station to prevent a reduction of the data-channel throughput without causing deficiencies in capacities of PDCCH according to the standard up to LTE Rel. 10, and therefore it is possible to support the base station cooperation.

The control channel allocation part 110 allocates the downlink control channel (ePDCCH) to the partial region of the data-channel region (see FIGS. 6A and 6B) based on the parameter Z used to demodulate the downlink control channel (ePDCCH), i.e. the parameter Y used to generate a channel state information reference signal (CSI-RS).

The wireless communication program causes the computer of the terminal 200 (see FIG. 2) to implement a procedure of selecting a first parameter from among a plurality of parameters (e.g. the parameters Y1 and Y3) used to demodulate the downlink control channel (ePDCCH) allocated to the partial region of the data-channel (PDSCH) region (see FIGS. 6A and 6B); a procedure of decoding the downlink control channel based on a demodulation reference signal (i.e. an ePDCCH demodulation reference signal) generated by the first parameter; and a procedure of selecting a second parameter from among a plurality of parameters and decoding the downlink control channel based on a demodulation reference signal (i.e. an ePDCCH demodulation reference signal) generated by the second parameter when it is impossible to perform decoding based on the first parameter.

The wireless communication program causes the computer of the upper transmission station 100 (see FIG. 2) to implement a procedure of allocating the downlink control channel (ePDCCH) to the partial region of the data-channel (PDSCH) region (see FIGS. 6A and 6B) based on a demodulation reference signal (i.e. an ePDCCH demodulation reference signal) generated by the parameter Z (e.g. the parameter Y) used to demodulate the downlink control channel and correlating the partial region to each of the parameters used to demodulate the downlink control channel; and a procedure of transmitting the information (see FIGS. 7A and 7B), representing the correspondence between the partial region and the parameter used to demodulate the downlink control channel, in connection with a plurality of parameters.

The present invention is described heretofore by way of the embodiments with reference to the drawings; but detailed configurations thereof are not necessarily limited to the embodiments; hence, the present invention may embrace any design choices not departing from the essences of the invention.

For example, the upper transmission station and the lower transmission station may be connected via RRH (Remote Radio Head).

The format of data used to notify ePDCCH-potential regions is not necessarily limited to table forms (see FIGS. 7A and 7B), and therefore it is possible to employ any formats securing correspondence between the parameter Y and ePDCCH.

It is possible to store programs, used to embody the aforementioned wireless communication system, in computer-readable storage media, and therefore it is possible for the computer system, loading programs stored in storage media, to carry out processing by executing programs. Herein, the "computer system" may include OS and hardware such as peripheral devices.

Additionally, the "computer system" employing the WWW system may handle the homepage providing environment (or the homepage display environment). The "computer-readable storage media" may include flexible disks, magneto-optical disks, ROM, rewritable nonvolatile memory such as flash memory, portable media such as CD-ROM, and storage devices such as hard disks installed in computer systems.

Moreover, the "computer-readable storage media" may include any devices capable of holding programs for a certain time such as nonvolatile memory (e.g. DRAM (Dynamic Random Access Memory)) installed in computer systems serving as servers and clients receiving programs transmitted thereto via communication lines, telephone lines, or networks such as the Internet.

The foregoing programs may be transmitted from the computer system storing programs in storage devices to the other computer system via transmission media or via waves propagating through transmission media. Herein, the "transmission media" used to transmit programs may refer to media having functions of transmitting information such as communication lines, telephone lines, and networks (communication networks) such as the Internet.

The foregoing programs may be drafted to achieve part of the foregoing functions.

Additionally, the foregoing programs may be drafted in the form of differential files (differential programs) which can be combined with programs pre-installed in the computer system so as to achieve the foregoing functions.

REFERENCE SIGNS LIST

100 upper transmission station
101 to 104 lower transmission station
110 control channel allocation part
120 data channel allocation part
130 transmitter-receiver part
200 terminal
210 measurement part
220 decoding part
230 transmitter-receiver part
300 cell

The invention claimed is:

1. A wireless communication system including a plurality of transmission stations serving as an upper transmission station and a plurality of lower transmission stations ascribed to different sequence initial values in connection with a terminal serving as a reception station,
wherein each of the plurality of transmission stations has at least one ePDCCH (enhanced physical downlink control channel) available region disposed at a data-channel region among a plurality of radio resources,
wherein the plurality of transmission stations are permutated in an order according to performance indexes thereof,
wherein the upper transmission station generates a demodulation reference signal (DMRS) for each transmission station,
wherein the upper transmission station selects a specific lower transmission station among the plurality of lower transmission stations according to the order of permutation, thus allocating the ePDCCH available region of the specific lower transmission station to an ePDCCH of the terminal,
wherein the terminal decodes the ePDCCH by use of the demodulation reference signal corresponding to a sequence initial value of the specific lower transmission station, and
wherein the upper transmission station selects the specific lower transmission station according to the order of permutation by way of:
(i) selecting the specific lower transmission station having a highest performance index among the plurality of lower transmission stations; and
(ii) selecting another specific lower transmission station whose performance index is lower than the highest performance index when the terminal fails to decode the ePDCCH based on the sequence initial value of the specific lower transmission station having the highest performance index.

2. The wireless communication system according to claim 1, wherein the demodulation reference signal is generated based on a parameter of a channel state information reference signal for each transmission station.

3. The wireless communication system according to claim 1, wherein the performance index corresponds to a signal-to-interference ratio or reception intensity of the demodulation reference signal.

4. The wireless communication system according to claim 1, wherein the performance index corresponds to reception intensity of a sounding reference signal for each transmission station.

5. A terminal comprising:
a first receiver configured to receive correspondence information between a data-channel region serving as an ePDCCH (enhanced physical downlink control channel) available region and a parameter used to demodulate an ePDCCH in connection with a plurality of parameters;
a second receiver configured to receive the ePDCCH allocated to the data-channel region; and
a decoding part configured to decode the ePDCCH based on a demodulation reference signal generated by a first parameter selected from among the plurality of parameters or a second parameter selected from among the plurality of parameters when the decoding part fails to perform decoding based on the first parameter.

6. The terminal according to claim 5, wherein the first parameter is used to generate a channel state information reference signal, and wherein the second parameter is used to generate the channel state information reference signal when the decoding part fails to perform decoding based on the first parameter.

7. The terminal according to claim 5, wherein the decoding part selects the transmission station based on a signal-to-interference ratio or reception power of the demodulation reference signal.

8. The terminal according to claim 5, wherein the decoding part selects the transmission station based on reception intensity of a sounding reference signal for each transmission station.

\* \* \* \* \*